United States Patent
Azadet et al.

(10) Patent No.: US 9,942,078 B2
(45) Date of Patent: Apr. 10, 2018

(54) METHODS AND APPARATUS FOR SIMULTANEOUS ESTIMATION OF FREQUENCY OFFSET AND CHANNEL RESPONSE FOR MU-MIMO OFDMA

(75) Inventors: Kameran Azadet, Morganville, NJ (US); Samer Hijazi, Bethlehem, PA (US); Albert Molina, Madrid (ES); Ramon Sanchez, Madrid (ES)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1137 days.

(21) Appl. No.: 12/474,344

(22) Filed: May 29, 2009

(65) Prior Publication Data
US 2010/0304687 A1 Dec. 2, 2010

(51) Int. Cl.
*H04L 27/26* (2006.01)
*H04L 25/02* (2006.01)

(52) U.S. Cl.
CPC ...... *H04L 27/2657* (2013.01); *H04L 25/0202* (2013.01); *H04L 27/2675* (2013.01); *H04L 27/2695* (2013.01)

(58) Field of Classification Search
CPC .................................................. H04L 25/0202
USPC ..................................................... 455/67.16
See application file for complete search history.

(56) References Cited

U.S. PATENT DOCUMENTS

| | | | |
|---|---|---|---|
| 7,782,967 B2 * | 8/2010 | Cheng et al. ................. | 375/260 |
| 2002/0093976 A1 * | 7/2002 | Razoumov et al. .......... | 370/444 |
| 2002/0137461 A1 * | 9/2002 | Grundvig et al. ............... | 455/41 |
| 2003/0043887 A1 * | 3/2003 | Hudson ................. | H04L 1/0618 375/144 |
| 2004/0146117 A1 * | 7/2004 | Subramaniam et al. ..... | 375/260 |
| 2004/0198296 A1 * | 10/2004 | Hui et al. ...................... | 455/296 |
| 2006/0052062 A1 | 3/2006 | Heddergoti et al. | |
| 2006/0233270 A1 * | 10/2006 | Ahn ..................... | H04B 7/0851 375/260 |
| 2008/0095108 A1 * | 4/2008 | Malladi et al. ............... | 370/329 |
| 2008/0144486 A1 * | 6/2008 | Wilhelmsson .... | H04L 25/03006 370/208 |
| 2008/0232516 A1 | 9/2008 | Cheng et al. | |

(Continued)

FOREIGN PATENT DOCUMENTS

WO 2008129114 A1 10/2008

OTHER PUBLICATIONS

Gibson, J.D., "The Mobile Communications Handbook (Electrical Engineering Handbook)," Chapter 5, p. 1, by John G. Proakis (Apr. 1, 1999).

*Primary Examiner* — Hsin-Chun Liao
(74) *Attorney, Agent, or Firm* — Sheridan Ross P.C.

(57) ABSTRACT

Methods and apparatus are provided for simultaneous estimation of frequency offset and channel response for a communication system, such as a MU-MIMO communication system. An iterative method is provided for estimating frequency offset and channel response for a plurality of frequency resources. The channel response is estimated for a set of users sharing a given one of the frequency resources. In addition, the frequency offset is estimated for the users in the set, wherein the channel response and frequency offset of users not in the set are maintained at their latest updated values. Initially, the channel response of a user can be an ideal channel response and the frequency offset can be approximately zero.

20 Claims, 5 Drawing Sheets

(56) References Cited

U.S. PATENT DOCUMENTS

2009/0186590 A1\* 7/2009 Gale .............................. 455/272
2010/0093300 A1\* 4/2010 Nuutinen et al. ............. 455/296

\* cited by examiner

METHODS AND APPARATUS FOR SIMULTANEOUS ESTIMATION OF FREQUENCY OFFSET AND CHANNEL RESPONSE FOR MU-MIMO OFDMA

FIELD OF THE INVENTION

The present invention relates to frequency offset and channel response estimation and, more particularly, to a Multi User Multiple Input Multiple Output (MU-MIMO) communication environment with a Generalized Carrier Assignment Scheme (CAS), such as Long Term Evolution communication system.

BACKGROUND OF THE INVENTION

Orthogonal Frequency Division Multiple Access (OFDMA) techniques are an important part of multiple broadband access technologies. Long Term Evolution, the standard for fourth generation mobile communications, employs single carrier frequency division multiple access (SC-FDMA) in the uplink, a novel single carrier multiple access technique with similar performance and essentially the same overall structure as those of an OFDMA system, but with a better peak-to-amplitude power ratio. When combined with MU-MIMO techniques, SC-FDMA is able to deliver very high data rates with very good spectral efficiency and moderate complexity.

While OFDMA facilitates channel estimation and equalization tasks, the stringent requirements of time and frequency synchronization become an important issue. Time synchronization can be highly simplified through the insertion of a cyclic prefix (CP). Frequency offset between the transmitter and the receiver destroy the orthogonality among subcarriers, thus producing inter-carrier interference (ICI) that can strongly degrade its performance and has no straightforward solution.

A number of techniques have been proposed or suggested for the estimation and correction of frequency offset in the uplink. For example, Michele Morelli et al., "Synchronization Techniques for Orthogonal Frequency Division Multiple Access (OFDMA): A Tutorial Review," Proc. of IEEE, Vol. 95, No. 7 (July 2007), describes iterative algorithms based on time domain space-alternating projection expectation-maximization (TD-SAGE). While effective, the disclosed time domain approach does not take advantage of the frequency separation of the different users, or the fact that most channel estimation methods are implemented in the frequency domain.

There are two aspects that significantly complicate the task of estimating and correcting frequency offset in the uplink. First, the carrier assignment scheme (CAS) plays in important role in maximizing the capacity of the channel, since the flexibility to freely distribute the available subcarriers between the different users based on the different channel conditions affecting each user, provide a form of "multi-user diversity." A Generalized CAS allows a near unconstrained carrier assignment procedure that provides the maximum diversity gain but also complicates frequency offset estimation. In addition, in the uplink, each mobile user accessing the base station will be affected by a different amount of frequency offset.

A need therefore exists for methods and apparatus for simultaneous estimation of frequency offset and channel response for MU-MIMO OFDMA communication systems.

SUMMARY OF THE INVENTION

Generally, methods and apparatus are provided for simultaneous estimation of frequency offset and channel response for a communication system, such as a MU-MIMO communication system. According to one aspect of the invention, an iterative method is provided for estimating frequency offset and channel response for a plurality of frequency resources. The channel response is estimated for a set of users sharing a given one of the frequency resources. In addition, the frequency offset is estimated for the users in the set, wherein the channel response and frequency offset of users not in the set are maintained at their latest updated values. Initially, the channel response of a user can be an ideal channel response and the frequency offset can be approximately zero.

The iterations can optionally stop when a predefined threshold is satisfied or when a predefined number of iterations is reached. The frequency offset is optionally determined for a first antenna and the determined frequency offset is then used for at least one additional antenna. The steps of estimating the channel response and estimating the frequency offset are optionally performed simultaneously. In one exemplary embodiment, the disclosed method employs a space-alternating projection expectation-maximization (SAGE) algorithm in the frequency domain.

A more complete understanding of the present invention, as well as further features and advantages of the present invention, will be obtained by reference to the following detailed description and drawings.

DETAILED DESCRIPTION

The present invention provides methods and apparatus for simultaneous estimation of frequency offset and channel response for an exemplary MU-MIMO OFDMA uplink with generalized carrier assignment scheme through a space-alternating projection expectation-maximization (SAGE) algorithm in the frequency domain. The present invention recognizes that frequency offset correction techniques require knowledge of the channel response and vice versa. Therefore, an efficient method is provided for the simultaneous estimation of both the frequency offset and the channel response. Channel and frequency estimates are obtained using a training block that is periodically transmitted by each user in the uplink frame.

As discussed further below in conjunction with FIG. 3, the exemplary algorithm consists of iterations and cycles. Iterations comprise a number of cycles. In each cycle, the channel response for a set of users sharing the same frequency resource (MU-MIMO) is estimated (and updated), keeping the channel and frequency offset of the other users at their latest updated values. The frequency offset is then estimated for each of these users in the set assuming the latest estimations of channel and frequency offset for all other users. In the first iteration, the algorithm takes previously calculated estimates as a starting point for old users and ideal channel response and no frequency error for new users. The iteration stops when the programmed number of updates is reached. Generally, the frequency error can be estimated only for one receive antenna in the case of MU-MIMO, and then that estimate can be used for the other active antenna.

Figure 1:
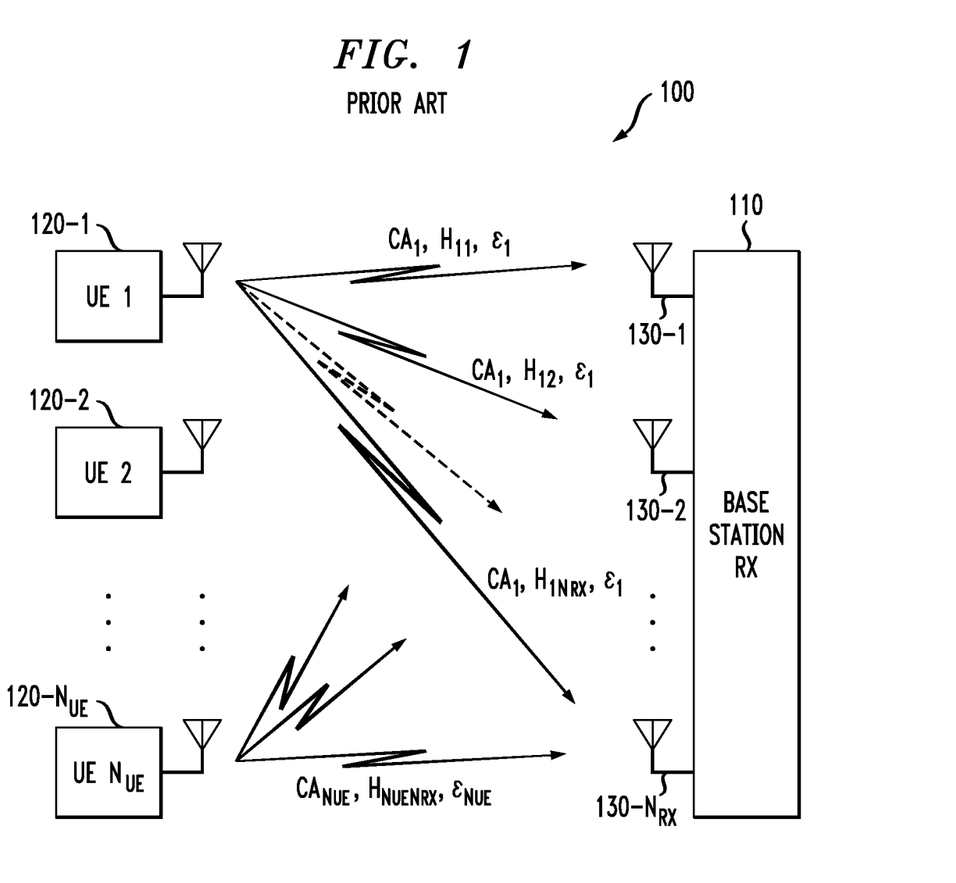
FIG. 1 illustrates an exemplary communication environment in which the present invention can operate.

FIG. 1 illustrates an exemplary communication environment 100 in which the present invention can operate. As shown in FIG. 1, the exemplary communication environment 100 is a MU-MIMO OFDMA uplink with a generalized carrier assignment scheme. In further variations, the invention may be applied in an SC-FDMA system, as well as other MIMO schemes, such as Single User (SU) MIMO, as would be apparent to a person of ordinary skill in the art. The exemplary communication environment 100 comprises a base station 110 and a plurality of user equipment (UE) devices 120-1 through 120-$N_{UE}$. The base station 110 has a plurality of receive antennas 130-1 through 130-$N_{RX}$. It is noted that in the following mathematical description the number of antennae is also referred to as A. Generally, as shown in FIG. 1, each UE 120 transmits using a corresponding Carrier Assignment (CA), a frequency error, ε, and through a specific channel response, H, that is different for each transmitter/receiver pair of antenna.

Figure 2:
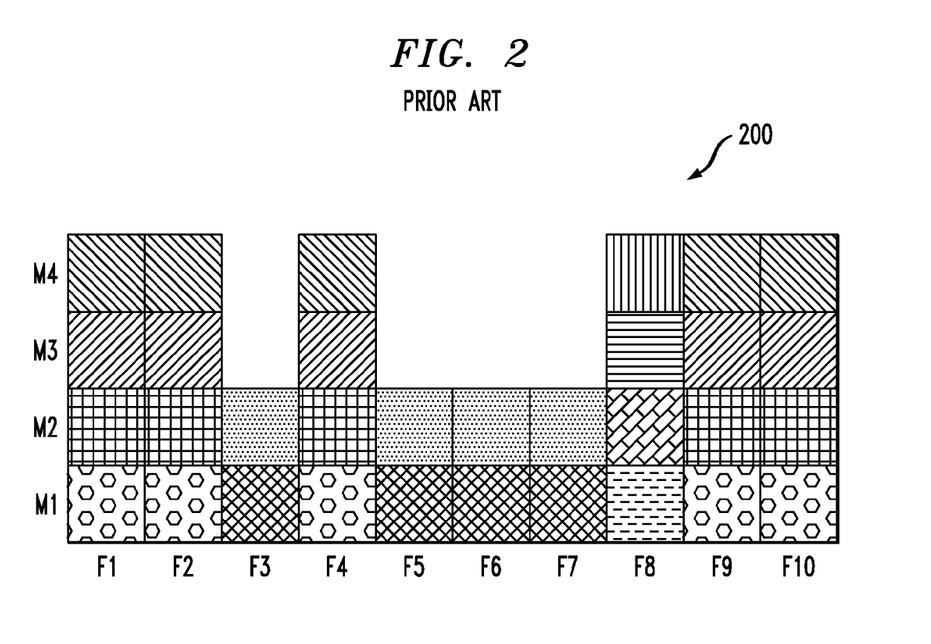
FIG. 2 illustrates an exemplary Generalized Carrier Assignment Scheme.

FIG. 2 illustrates an exemplary Generalized Carrier Assignment Scheme 200. In the exemplary scheme 200 of FIG. 2, ten users (each with a different fill pattern) share four spatial dimensions, M1 through M4, and ten frequency bands, F1 through F10. Thus, as shown in FIG. 2, multiple users can share the same frequency channel. For each user, the frequency error, ε, can be different. In addition, as shown in FIG. 2, if multiple frequency bands are assigned to a given user, they may not be consecutive.

Assumptions

It is noted that actual values shown are merely exemplary of a typical configuration for LTE. There are F allocated frequency bands, f=0 . . . F−1.

There are $M_f$ users per frequency band, $0 \leq m \leq M_f-1$. There may be up to four users per frequency band allocation, $M_f \leq 4$.

$S_{m,f}(n)$ are the sub-carriers of user m and band f. Different allocated frequency bands should be non-overlapping.

The Fast Fourier Transform (FFT) size, N, where N is typically equal to 1024.

There are A receive antennas, a=0 . . . A−1.

Equations

The signal at receive antenna a is given by:

$$r^a(k) = \sum_{f=0}^{F-1} \sum_{m=0}^{M_f-1} e^{j\frac{2\pi}{N}\varepsilon_{m,f}k} \sum_{l=0}^{L-1} h_{m,f}(l) s_{m,f}(k-l) + w(k)$$

where $\varepsilon_{m,f}$ is the frequency error for user m of band f normalized to the sub-carrier spacing, L is the maximum channel length over all users and $s_{m,f}$ is the IFFT of $S_{m,f}$.

In the frequency domain, after the cyclic prefix extraction and the FFT, for each sub-carrier n:

$$R^a(n) = \sum_{f=0}^{F-1} \sum_{m=0}^{M_f-1} \sum_{r=0}^{N-1} f(r, \varepsilon_{m,k}) H_{m,f}((n-r)_N) S_{m,f}((n-r)_N) + W(n)$$

where $$f(r, \varepsilon_{m,f}) = \sum_{k=0}^{N-1} e^{-j\frac{2\pi}{N}(r-\varepsilon_{m,f})k}$$

is the FFT of the frequency error exponential $$e^{j\frac{2\pi}{N}\varepsilon_{m,f}k}, (\cdot)_N$$

denotes modulo-N indexing.

The number of cancelled ICI components can be limited to $\pm N_{ICI}$. Assuming that there are frequency guard bands at the extremes of the band, then there is typically no need to perform circular convolution and the sub-index N can be dropped, as follows:

$$R^a(n) = \sum_{f=0}^{F-1} \sum_{m=0}^{M_f-1} \sum_{r=-N_{ICI}}^{N_{ICI}} f(r, \varepsilon_{m,f}) H_{m,f}(n-r) S_{m,f}(n-r) + W(n).$$

Figure 3:
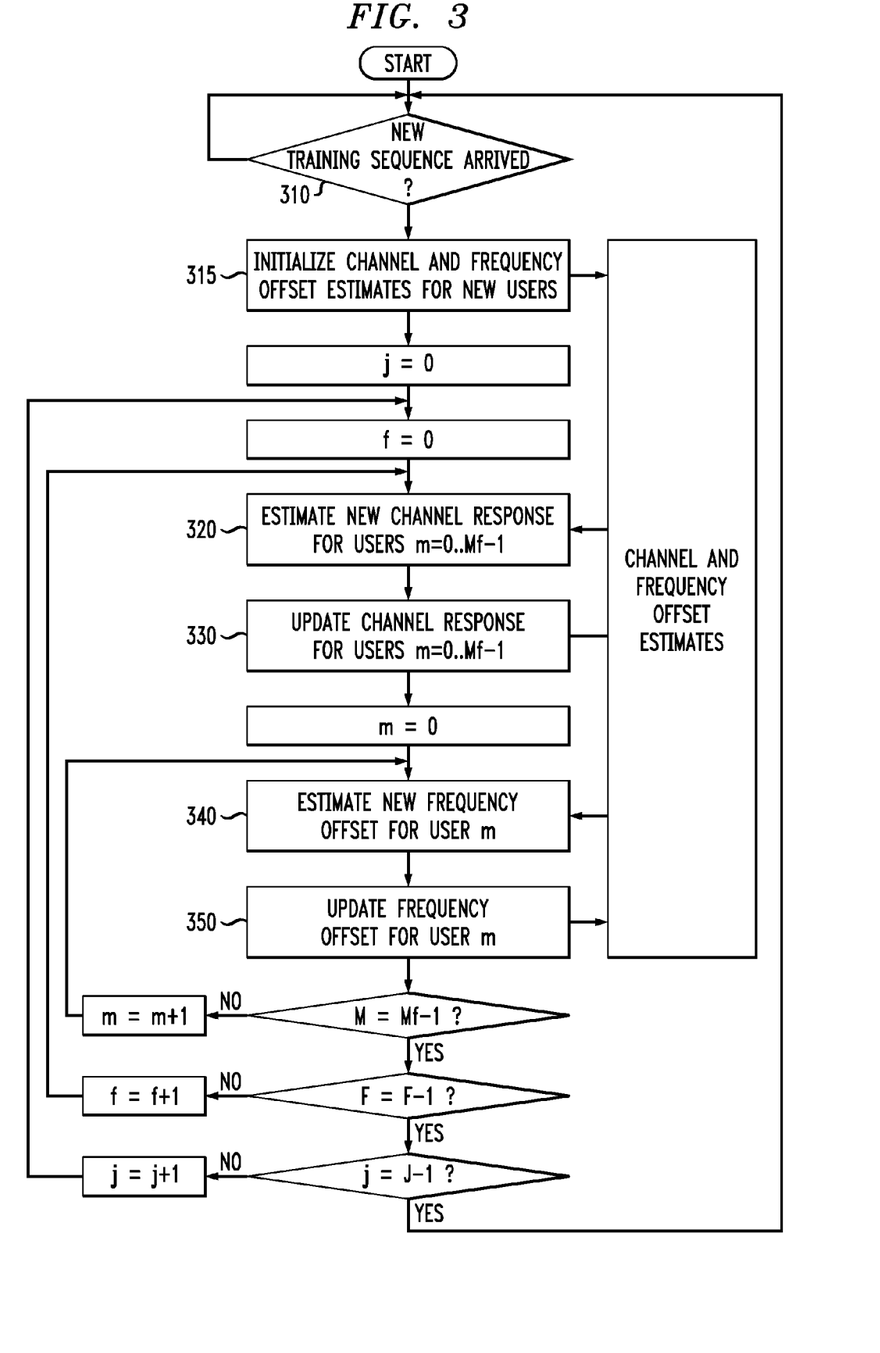
FIG. 3 is a flow chart describing an exemplary implementation of a frequency offset and channel response estimation process incorporating features of the present invention.

FIG. 3 is a flow chart describing an exemplary implementation of a frequency offset and channel response estimation process 300 incorporating features of the present invention. Generally, the frequency offset and channel response estimation process 300 jointly estimates $\varepsilon_{m,f}$ and $H_{m,f}$ for all users. The frequency offset and channel response estimation process 300 is typically implemented by a processor in the base station 110 of FIG. 1.

As shown in FIG. 3, the frequency offset and channel response estimation process 300 employs a counter, j, to track the number of iterations, a counter, f, to track the allocated frequency bands and a counter, m, to track the users in a given frequency band.

At every slot, at the arrival of a training block during step 310, such as the Demodulation Reference Signal (DMRS), 1. For antenna a=0. Perform j=0 . . . J−1 iterations of the following algorithm:

a. For all allocated frequency bands fi=0 . . . F−1 i. Calculate for n spanning all sub-carriers of frequency band:

$$y^{(j)^a}{}_{fi}(n) = R^a(n) - \sum_{f=0}^{F-1} \sum_{m=0}^{M_f-1} \sum_{r=-N_{ICI}}^{N_{ICI}} f(r, \hat{\varepsilon}_{m,f}) \hat{H}_{m,f}(n-r) S_{m,f}(n-r) + \sum_{m=0}^{M_f-1} \hat{H}_{m,fi}(n) S_{m,fi}(n)$$

where $\hat{\varepsilon}_{m,f}$ is the most recently estimated value of $\varepsilon_{m,f}$ and $\hat{H}_{m,f}$ is the most recently estimated value of $H_{m,f}$. It is also noted that in the first iteration, new users have $\hat{\varepsilon}_{m,f}=0$ and $\hat{H}_{m,f}=0$ during step 315. $\hat{H}_{m,f}(n)=0$ for values of n outside the allocated frequency band ii. Using $y^{(j)^a}{}_{fi}(n)$, estimate the channel response during step 320 for all MU-MIMO users, $\hat{H}_{m,fi}^{(j)}(n)$ m=0 . . . $M_f-1$ of this band. The channel response is then updated during step 330 for all MU-MIMO users, $\hat{H}_{m,fi}^{(j)}(n)$ m=0 . . . $M_f-1$.

iii. For mi=0 . . . $M_f$–1, calculate for n spanning all sub-carriers of this frequency band and $N_{ICI}$ sub-carriers on either of the adjacent bands:

$$x^{(j)^a}_{fi,mi}(n) = R^a(n) - \sum_{\substack{f=0 \\ \text{except when} \\ (m=mi)\& \\ (f=fi)}}^{F-1} \sum_{m=0}^{M_f-1} \sum_{r=-N_{ICI}}^{N_{ICI}} f(r, \hat{\varepsilon}_{m,f}) \hat{H}_{m,f}(n-r) S_{m,f}(n-r)$$

where $\hat{\varepsilon}_{m,f}$ is the most recently estimated value of $\varepsilon_{m,f}$ and $\hat{H}_{m,f}$ is the most recently estimated value of $H_{m,f}$. During step 340, search for the value of $\hat{\varepsilon}_{mi,fi}$ that maximizes the following expression:

$$c(\hat{\varepsilon}_{mi,fi}) = \sum_n \text{Re}\left\{x^{(j)^a}_{fi,mi}(n) \sum_{r=-N_{ICI}}^{N_{ICI}} f(r, \hat{\varepsilon}_{mi,fi}) \hat{H}_{mi,fi}(n-r) S_{m,f}(n-r)\right\}$$

The frequency offset is then updated during step 350 for all users. For antennas a=1 . . . A–1, the frequency error estimates from antenna a=0 are used and the channel response is estimated.

Figure 4:
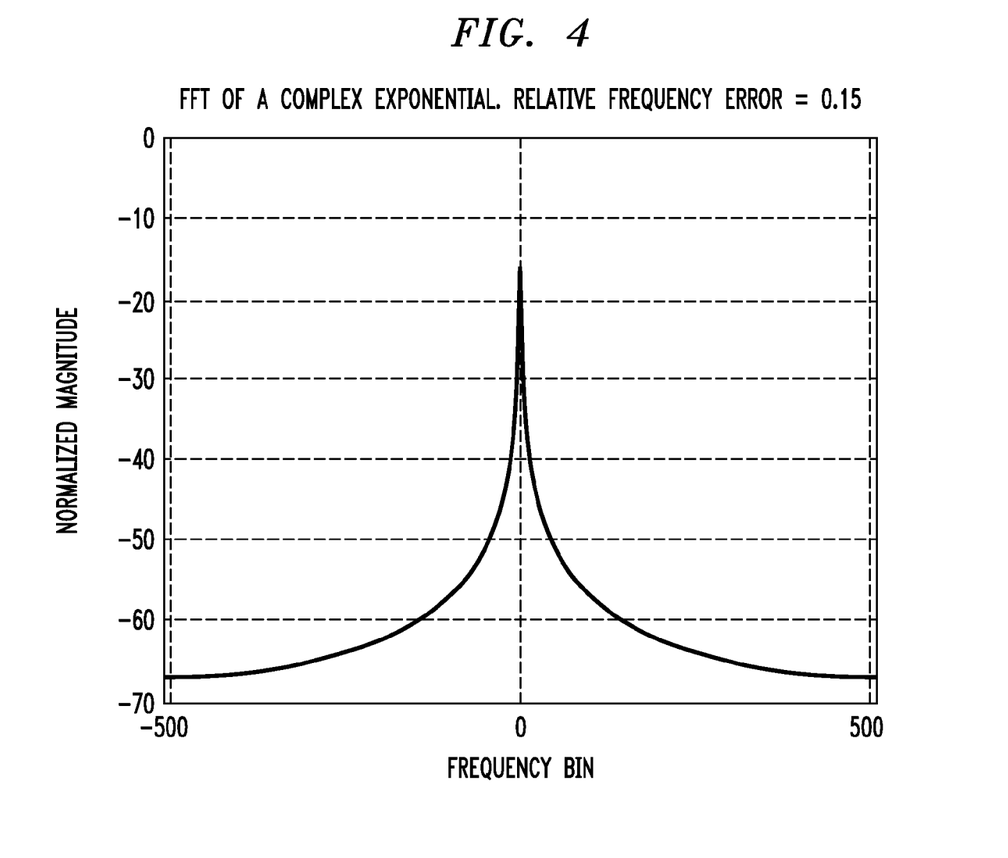
FIG. 4 illustrates $f(r, \varepsilon_{m,f})$, the FFT of the frequency error exponential.
Figure 5:
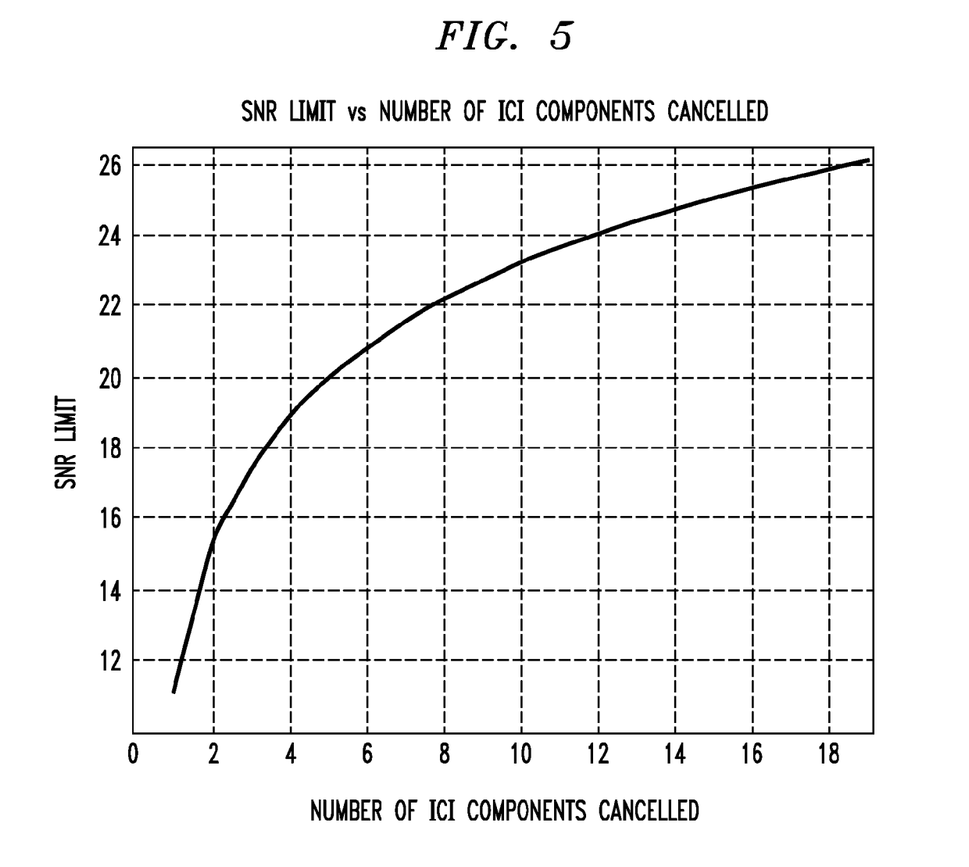
FIG. 5 illustrates the signal-to-noise ratio (SNR) limit imposed by this effect, as a function of the number of components that are cancelled

FIG. 4 illustrates $f(r, \varepsilon_{m,f})$, the FFT of the frequency error exponential, and FIG. 5 illustrates the signal-to-noise ratio (SNR) limit imposed by this effect, as a function of the number of components of $f(r, \varepsilon_{m,f})$ that are cancelled. As shown in FIGS. 4 and 5, it is typically sufficient to cancel a small number of contributions. Canceling 11 components on each side of each carrier, for example, could be sufficient, since the SNR limit is around 23.6 dB. This means that only the interference from other sub-carriers in the same block, and of sub-carriers on adjacent blocks, would need to be cancelled.

Conclusion

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. An iterative method for estimating frequency offset and channel response for a plurality of frequency resources, comprising:
    a first cycle of operations including:
        estimating a first channel response for a set of users that are assigned to a same, current frequency band and sharing a same set of subcarriers in the current frequency band during simultaneous communication, wherein the set of subcarriers is a single frequency resource in the plurality of frequency resources, wherein the set of users is part of a plurality of users that also includes users not in said set, and wherein the first channel response includes information regarding a spatial arrangement of the set of users;
        updating the first channel response for the set of users; and
        estimating and updating first frequency offsets for the set of users in the current frequency band based on the updated first channel response and a channel response and a frequency offset of the users not in said set, wherein the channel response and the frequency offset of the users not in said set are at their latest updated values; and
    a second cycle of operations, subsequent to the first cycle of operations and including:
        estimating a second channel response for the set of users for a next frequency band to be shared by the set of users for the simultaneous communication;
        updating the second channel response for the set of users; and
        estimating and updating second frequency offsets the set of users in the next frequency band based on the updated second channel response and the channel response and the frequency offset of the users not in said set.

2. The method of claim 1, wherein the first frequency offset of a user in the set of users is initially approximately zero.

3. The method of claim 1, wherein said frequency resource is provided by a multi-user multiple-input multiple-output (MU-MIMO) communication system.

4. The method of claim 1, further comprising:
    iteratively performing the first cycle of operations and the second cycle of operations; and
    stopping said iterations when a predefined threshold number of iterations is satisfied.

5. The method of claim 1,
    wherein the first and second frequency offsets are determined for an antenna and wherein a selected one of the first and second frequency offsets are applied to at least one additional antenna.

6. The method of claim 1, wherein said steps of estimating the first channel response and estimating the first frequency offsets are performed substantially simultaneously.

7. The method of claim 1, wherein said method employs a space-alternating projection expectation-maximization (SAGE) algorithm in the frequency domain.

8. The method of claim 1, wherein the set of users contains less than or equal to four users.

9. The method of claim 1, further comprising cancelling a number of inter-carrier-interference (ICI) components based on a desired signal-to-noise ratio (SNR) limit.

10. A system for estimating frequency offset and channel response for a plurality of frequency resources, comprising:
a memory; and
at least one processor, coupled to the memory, operative to:
perform a first cycle of operations to:
estimate a first channel response for a set of users that are assigned to a same, current frequency band and sharing a same set of subcarriers in the current frequency band for simultaneous communication, wherein the set of subcarriers is a single frequency resource in the plurality of frequency resources, wherein the set of users is part of a plurality of users that also includes users not in said set, and wherein the first channel response includes information regarding a spatial arrangement of the set of users;
update the first channel response for the set of users; and
estimate and update first frequency offsets for the set of users in the current frequency band based on the updated first channel response and a channel response and a frequency offset of the users not in said set, wherein the channel response and the frequency offset of the users not in said set are at their latest updated values; and
perform a second cycle of operations, subsequent to the first cycle of operations, to:
estimate a second channel response for the set of users for a next frequency band to be shared by the set of users for the simultaneous communication;
update the second channel response for the set of users; and
estimate and update second frequency offsets the set of users in the next frequency band based on the updated second channel response and the channel response and the frequency offset of the users not in said set.

11. The system of claim 10, wherein the first frequency offset of a user in the set of users is initially approximately zero.

12. The system of claim 10, wherein said frequency resource is provided by a multi-user multiple-input multiple-output (MU-MIMO) communication system.

13. The system of claim 10, wherein the at least one processor is operative to iteratively perform the first cycle of operations and the second cycle of operations and stop said iterations when a predefined threshold number of iterations is satisfied.

14. The system of claim 10, wherein said first and second frequency offsets are determined for a first antenna, and wherein a selected one of the first and second frequency offsets are applied at least one additional antenna.

15. The system of claim 10, wherein the at least one processor is operative to perform said estimations of said first channel response and said first frequency offsets substantially simultaneously.

16. The system of claim 10, wherein said at least one processor employs a space-alternating projection expectation-maximization (SAGE) algorithm in the frequency domain.

17. The system of claim 10, wherein the at least one processor is operative to:
store said channel response for the set of users; and
store said frequency offset for the set of users.

18. The system of claim 10, wherein the at least one processor is operative to estimate said first channel response and said first frequency offsets in response to a training sequence.

19. The system of claim 10, wherein the set of users contains less than or equal to four users.

20. The system of claim 10, wherein the at least one processor is operative to cancel a number of inter-carrier-interference (ICI) components based on a desired signal-to-noise ratio (SNR) limit.

* * * * *